Patented Mar. 7, 1939

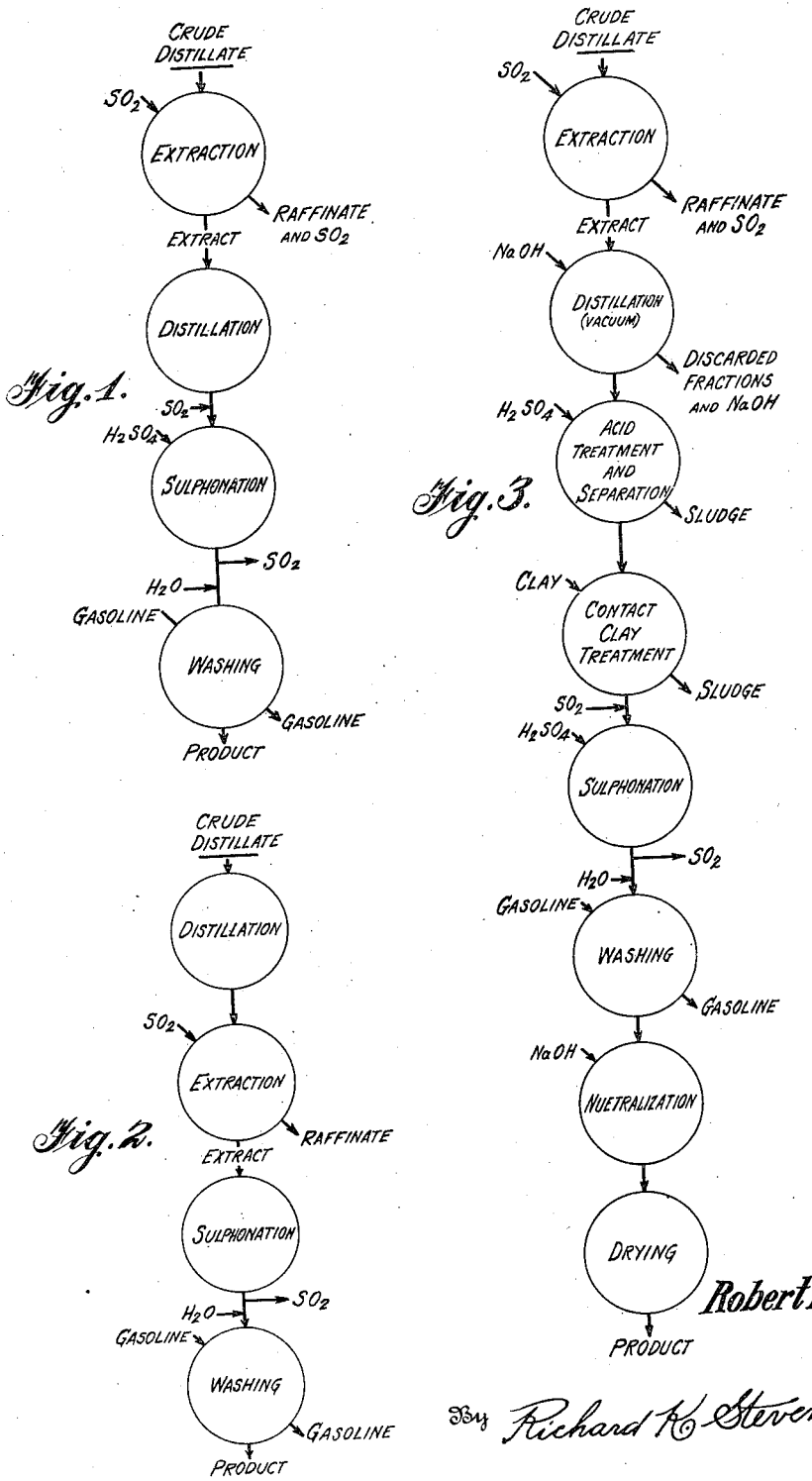

2,149,662

UNITED STATES PATENT OFFICE 2,149,662

MINERAL OIL SULPHONATES

Robert L. Brandt, New York, N. Y., assignor to Colgate-Palmolive-Peet Company, Jersey City, N. J., a corporation of Delaware Application April 22, 1937, Serial No. 138,463

9 Claims. (Cl. 260—504)

This invention relates to certain new chemical compositions. The new compositions may be generally described as products or the salts of products of the reaction of sulphonating agents upon certain portions of mineral oils. The products are particularly useful as deterging, wetting, foaming, frothing or emulsifying agents and, in general, as modifiers of capillary action and of surface tension. They are highly useful as textile assistants, as flotation agents, as household detergents, as industrial emulsifying agents and for many other purposes.

The possibility of using petroleum oils or portions thereof as a raw material from which to prepare the so-called sulphonic acids and their salts has long been considered and is the subject of numerous patents. For example, Ludwig Otto Helmers in U. S. Patent 525,784, granted September 11, 1894, describes the treatment of mineral oils with sulphuric acid to produce sulphonic acids, and Robert T. Osborn and a co-inventor in U. S. Patent 1,955,859, granted April 24, 1934, describe the treatment of a sulphur dioxide extract of mineral oil, also to produce sulphonic acids. Further, an English patent, No. 346,945, specifies the treatment of motor oil with sulphur trioxide or other sulphonating agent in the presence of liquid sulphur dioxide.

Thus, in many instances and in many ways, prior to this invention, mineral oils and sulphuric acid have been placed in contact and have to a greater or less extent been reacted together, but insofar as the present inventor has been able to determine none of these products made according to the prior art has been entirely satisfactory for practical use as a deterging, wetting, emulsifying, or forming agent or the like.

According to an application of this same inventor now on file in the United States Patent Office, Serial No. 117,096, filed December 21, 1936, a method is provided by which sulphuric acid reaction products of relatively high purity and effectiveness for the purposes mentioned, may be produced from mineral oil. Certain improvements in the process there described have now been discovered, and these improvements comprise the present invention.

When the materials extracted from petroleum oils are treated with sulphuric acid, polymerization, oxidation, sulphonation, condensation and other types of reactions occur in greater or less degree, depending on the strength of acid, kind of oil, temperature, time, oil-acid volume relations and other factors. With all of these reactions taking place and all of these conditions to be controlled, it is not surprising that difficulty has been encountered in preventing the formation of unwanted compounds which give the final material both odor and color and detract greatly from its efficiency. By the process of my prior application it was found that despite the numerous reactions that occurred and the general complexity of the chemistry involved, a relatively good material having very little or no odor or color and very good deterging efficiency, emulsifying properties and the like could be produced. By the present process even better products can be produced, in even higher yields.

As in the prior process it has been found that in order to bring about the desired reaction with a minimum of side reactions, other factors being equal, time and temperature are of great importance. Thus, it is desirable to contact the acid and extracted material as rapidly as is possible without permitting local overheating or a rise in temperature above certain limits. After the acid and extracted material have been mixed it is desirable to continue the reaction for only so long a time as is necessary to form the desired products and then to get the products out of contact with the strong mineral acid as quickly as possible. Any excessive time of contact reflects in poor color, lowered detersive and wetting out properties, and lower yields. In the processes of the present and prior applications of this inventor, rapidity of contact and low operating temperature are permitted by the use of liquid sulphur dioxide as a diluent, and this same liquid sulphur dioxide appears to assist the reaction in still another way, which is not understood, but may be generally designated as a catalytic effect of the liquid sulphur dioxide on the reaction between the extracted material and the sulphonating agent.

To illustrate the difficulty encountered in the practice of prior processes, an Edeleanu extract from transformer oil from Texas Gulf Coast crude was mechanically mixed with 102% sulphuric acid in the proportions of two parts of oil to one of acid. The viscosity of the mixture quickly became so very great as to preclude any possibility of forming a homogeneous mass. Not only this, but wide localized temperature variations occurred because of the highly viscous and sticky sludge that formed and settled out on the walls of the mixing device and acted as a heat insulator. With the mixture at 65° C., and the water circulating through the cooling jacket of the mixer at 6° C., the temperature of the mixture rose to 75° C., indicating the impracticability of temperature control under such circumstances. This result was obtained in spite of violent mechanical agitation and a large cooling surface.

In such a mixture as has been described there are evidently two phases present, one of which is relatively acid-soluble and the other of which is relatively acid-insoluble. As a consequence it is quite easy for the acid to contact with and act further than is desired upon the material that has already been reacted upon and is relatively acid-soluble, but it is extremely difficult to get the acid into intimate contact with the remaining material. The high viscosity adds to this difficulty and undesired side reactions and excessive localized temperature rises occur. As a result, the sulphonated product is obtained only in relatively low yields and is dark in color, of bad odor and of poor quality. Incidentally, the power required for mechanically mixing is far too high for efficient production.

In addition to these difficulties sulphonates of mineral oils, even though they appear, when dissolved in water, to be clear, may contain relatively large quantities of impurities. Thus a sodium sulphonate made from oil refinery sulphuric acid sludge was found, in one case, to contain 20% of oil, in another, 8% and in still another 40%. In addition to oil the products may contain small amounts of undesirable side reaction products such as resins, polymerized hydrocarbons, coloring matter, oil-soluble sulphonic acids, thio compounds and other materials that may be dark colored and/or malodorous and unstable.

Many of these compounds are highly objectionable in the finished products, as they prevent or hinder detersive action, rapid wetting-out and rapid solubility, and may be unstable on boiling or under acid or alkaline conditions. They are the cause of stickiness in hand washing, of a slight yellow stain or color in washed goods, and of other unwanted characteristics.

Even sulphonates made by the present process may contain small percentages of such impurities, though their aqueous dispersions are clear. This clarity is probably due to the hydrotropic properties of the water-soluble sulphonates, that is, their ability to emulsify water insoluble materials in water. If the impurities are left in the final product they unfit it for many of the uses for which it is intended. Washing with a low boiling hydrocarbon solvent is provided in both the present and prior processes, of this inventor, for the purpose of removing these impurities.

As a starting material, in either the present process or that of the aforementioned application, it is to be understood that any mineral oil or raw distillate therefrom may be used but it is preferred to employ a distillate from what is generally known as a naphthene base crude, such as a Texas Gulf Coast crude, as distinguished from, say, a Pennsylvania crude. It has been found that the lower viscosity raw distillates are, in general, to be desired.

The first step in the process of the applicant's prior application and usually in the present process is an extraction of the mineral oil or distillate to be used, with liquid sulphur dioxide, liquid sulphur dioxide plus benzol, or other preferential solvent, such as furfural, phenol, nitrobenzene, a propane-cresylic acid mixture, or the like. This operation yields a hydrocarbon oil extract which is characterized by high specific gravity in comparison to the starting oil, extremely low viscosity index, high Conradson carbon, and a high degree of unsaturation. It is generally thought that the extracts so obtained are composed of the more aromatic and unsaturated of the hydrocarbons constituting the original oil. In general, repeated extractions of the same oil will yield additional extract, but the extract so obtained is not quite so satisfactory for the present purposes as the extracts obtained by less exhaustive extraction.

According to the prior application mentioned above, the extract obtained by the process described was used directly for sulphonation. It has now been discovered, however, that considerable improvement in the final products can be effected by additional processing of the material to be sulphonated, which processing preferably takes place after extraction but may be accomplished either before or after the extraction and/or by carrying out the extraction under particular conditions.

The further processing mentioned may comprise further narrowing of the boiling range of the portion of the oil to be sulphonated, by additional fractionation of the material after extraction or by additional or more specific fractionation prior to extraction. It may also comprise treatment of the material to be used for sulphonation, with caustic soda to remove certain undesirable acidic constituents, treatment with sulphuric acid to remove asphalt-like and highly reactive bodies and water, and treatment with contact clay to assist in the sludge removal.

The condition that it has been found may be altered in the extraction process, so as to materially improve the final product, is temperature. By maintaining the temperature relatively low, that is, around $-15°$ C. to $+15°$ C. during the extraction, the final products are improved as to odor, color, and detergent and emulsifying efficiency and the yield is increased.

In its preferred form the present invention employs a combination of all of the treatments mentioned and the yield, deterging, wetting and emulsifying efficiency, odor and color of the products have been found to be materially improved thereby. Any one of the steps, however, is of importance and contributes toward a better product and each separately is therefore a part of the present invention and may be used with the more general method of the prior application to produce materially improved products.

In either the present process or that of the prior application the next step after treatment of the extract consists in dissolving the treated extracted material in liquid sulphur dioxide, or the extracted material being already in sulphur dioxide solution from the solvent extraction process, the next step may consist in diluting the solution with as much more sulphur dioxide as may be necessary to prepare it for the subsequent steps in the process. Usually, the extracted material should be diluted with about one to two times its volume of liquid sulphur dioxide. The resulting solution of extracted material in liquid sulphur dioxide is, even at low temperatures (below $0°$ C.), very fluid and non-viscous.

Having the desired solution of extracted material in liquid sulphur dioxide, the solution is cooled and mixed with a sulphonating agent, such as fuming sulphuric acid, keeping the temperature quite low during the mixing. Preferably, the temperature will be kept below $-5°$ C., during the mixing, though some extracted materials from some crude oil sources may permit or require either higher or lower temperatures.

Vigorous agitation should be used and in the event a batch method is employed it has been found preferable to add the acid to the oil, instead of the reverse, since this permits closer temperature control.

The amount of acid used, and its strength, will depend on the type of extracted material and on the characteristics desired in the finished product. Acid that is too weak is not vigorous enough and requires a longer contact time with the extracted material and may yield less desirable, dark colored finished products; acid that is too strong requires lower mixing temperatures, which in turn make necessary longer contact time and may result in darkening the finished products. Fuming sulphuric acid (commercial 20% oleum), in a quantity about equal in weight to the extracted material to be treated has been found satisfactory. Sulphur trioxide, chlorsulphonic acid or other sulphonating agent may also be used.

Upon completion of the original mixing of acid with the extracted materials and after the evolution of heat has substantially ceased, the reacting mixture will usually be raised to a temperature somewhat higher than that at which the original mixing took place, and the agitation continued for a sufficient length of time to complete the reaction. The original mixing will ordinarily be accomplished in a few minutes, after which the agitation will be continued for, say, an hour and a half to three hours.

The treatment with the sulphonating agent having been completed, the sulphur dioxide is removed by evaporation, preferably at or below the treating temperature, and may be recovered in a suitable manner. The remaining material is diluted with cold water, the temperature not being allowed to rise above about 20° C., and neutralized with a basic compound, such as caustic soda, soda ash, ammonia, triethanolamine, lime or the like.

In order to prepare a finished product of the best quality it is preferred, either before or after the neutralization to wash the product with a low boiling hydrocarbon solvent. A saturated gasoline, such as Pennsylvania grade, that is entirely volatile in the presence of steam at a temperature below that at which the final product is to be dried, is very satisfactory for this purpose, since it readily dissolves any residual unsulphonated oil and any other undesired products and any of the gasoline that remains after separation is completely removed itself in the drying operation.

It has been discovered that if the washing is performed after dilution with water but before neutralization, certain difficulties due to the formation of emulsions are avoided and for that reason the step is best performed at that time. It has also been discovered that the dilution with water may be greatly reduced without affecting the results of the process although the reduction in the amount of water added does cause the formation of two layers of material instead of one homogeneous dispersion or solution. The lower layer, which appears to contain the sulphonates of the higher boiling fractions in a water insoluble state, readily goes into water solution as soon as the oil content of the mixture is reduced by dissolving it out with gasoline or other solvent.

The solution of neutralized sulphuric acid reaction product, which also contains a considerable proportion of the sulphate of the neutralizing material as a result of its reaction with the excess sulphuric acid present may be used in this state for many purposes, or it may be further purified by extracting with isopropyl, butyl or a substantially water-insoluble alcohol in which the active ingredient is soluble, to free it from the by-product sulphate formed in the neutralizing process.

The final material, either with or without the by-product sulphate, may be formed into beads, flakes, chips, powders, solutions, liquid or plastic emulsions or other forms into which soap or other detergent or emulsifying materials are ordinarily made, either with or without the ingredients commonly used in such combinations, for example, soap fillers, perfumes, abrasives, fats, oils, waxes, and glycerine.

A more detailed understanding of the principles of this invention may be achieved by a consideration of the following specific examples of the process of making the new compositions and the accompanying drawing in which several embodiments of the process are illustrated by flow diagrams. In the drawing, Fig. 1 is a flow diagram of the new process in its most simple aspect; Fig. 2 is a flow diagram of a possible alternative to the procedure indicated by Fig. 1; and Fig. 3 is a flow diagram of the preferred process according to the present invention.

According to the procedure indicated by Fig. 1, a distillate from a Texas Gulf Coast crude, which distillate has a boiling range of 130° C. to 350° C. at 5 mm. pressure and a Saybolt viscosity at 100° F. of about 80 seconds may be extracted with about an equal volume of liquid sulphur dioxide by the usual Edeleanu process but at a temperature of around $-10°$ C., and the sulphur dioxide permitted to escape from the extract by lowering the pressure thereon.

The extracted material can then be fractionally distilled so as to separate the material boiling between about 210° C. and 250° C. at 5 mm. pressure from the remaining material and, if desired, the material boiling between 210° C. and 250° C. at 5 mm. pressure may also be divided into fractions of narrower boiling range. The material boiling between 210° C. and 250° C. at 5 mm. pressure has been found to yield far better products than that boiling materially outside of that range, and even within the range, certain fractions possess decided advantages which will be apparent from data to be given later.

The desired fractions of the extract having been obtained, they may individually or collectively be sulphonated by dissolving them in approximately from one to two times their volume of liquid sulphur dioxide, cooling to around $-15°$ C. and adding, over a period of about 15 minutes, an amount of 20% oleum about equal in weight to that of the material to be sulphonated. Vigorous agitation is practically a necessity during this operation and the use of a jacketed autoclave, provided with a stirring device, thermometer and pressure gauge has been found desirable. Considerable heat is evolved during and immediately after the addition of the acid, but temperature control can be maintained by circulating a cooling fluid through the jacket. The temperature should preferably not be permitted to rise above about $-5°$ C. After the acid addition, the temperature should be allowed to rise to $+5°$ C., and maintained at that point for about one and a half hours to three hours, depending on the type of oil, the agitation being continued. At the end of this period the sulphur dioxide may be separated as a vapor, by releasing the pressure at a temperature below +5° C.

To finish the preparation, the substantially sulphur dioxide free material may be mixed with twice its volume of ice-water, keeping the temperature below +20° C. There is a considerable amount of heat evolved at this step on account of the heat of dilution of the acids. After dilution, the aqueous solution or dispersion should be immediately batch-washed several times with 20% of its volume of gasoline, all of which is volatile below 250° F. It can then be neutralized with caustic soda, soda ash, or other neutralizing agent, and, finally, dried on soap-drying rolls at a roll temperature of 250° F.

The above operation will yield a substantially dry, fluffy powder even better in color than the products described in the prior application and having practically no odor either in the dry state or when rubbed to a lather on the hands.

Dilute solutions of varying concentrations range from a pale green tint to a very light yellow, but the colors are even more pale than those produced by the compounds of the prior application. The new materials are excellent foamers (comparing favorably with soap), excellent washing and detergent materials, especially in hard water, and also powerful wetting out and emulsifying agents.

As an alternate of the process just described, the same starting material, namely, a Texas Gulf Coast crude, may be treated by the process indicated by Fig. 2. By this process, the crude itself or a distillate therefrom is first fractioned to give one or more fractions boiling between about 210° C. and 250 C. at 5 mm. pressure. This fraction, or fractions, is then extracted with sulphur dioxide exactly as before and the resultant extract or extracts sulphonated, also as before. The only difference in this part of the procedure is that the extract being already in solution in sulphur dioxide, need not be removed therefrom, but simply brought to the proper dilution. The sulphur dioxide can, of course, be removed and added again, if desired, as, for example, when the extraction and sulphonation are to be performed at different places. The resulting products are generally similar to those made by the process of Fig. 1, but appear to possess certain specific differences that may lead to a preference of one over the other.

To achieve the best results that have been thus far attained it has been found desirable to modify the process indicated by Figs. 1 and 2 still further and include therein a treatment of the material to be sulphonated, at some point in its processing, with caustic soda, and with sulphuric acid in lesser proportion and strength and for a shorter time than is necessary to cause substantial sulphonation.

Preferably, these additional treatments are combined into the process as indicated by Fig. 3, but except for the fulfilling of certain conditions, they may be performed upon the oil in any order and at any stage of its treatment, prior to sulphonation. The conditions that must be fulfilled are that the sulphuric acid used in these treatments must not be allowed to stand in contact with the oil after treatment. Thus, if the sulphuric acid treatment is performed at any other time than immediately preceding sulphonation, the treatment must be followed by the caustic soda treatment or with contact clay so as to neutralize the remaining acid and remove sludge. If the caustic soda treatment does not immediately precede either the acid treatment or the distillation, or form a part of the distillation treatment as it does when the distillation is performed over caustic, a water washing step must follow the caustic treatment and this necessitates a drying operation for the presence of water from the washing step will materially impede sulphonation.

According to the preferred process as depicted by Fig. 3, a distillate from Texas Gulf Coast crude boiling between 130° C. and 350° C. at 5 mm. pressure and having Saybolt viscosity of 80 seconds at 100° F., may be countercurrently extracted with approximately an equal volume of liquid sulphur dioxide by the usual Edeleanu process, the sulphur dioxide separated from the extract and the extract then fractionally distilled, in vacuum, in the presence of about 0.1% of its weight of caustic soda. The fraction boiling between 220 C. and 240° C. at 5 mm. pressure may be treated with about 1% of its weight of 92% sulphuric acid by mixing it therewith for about forty-five minutes. Most of the sludge will settle out at once, but the remainder, which is known as "pepper" sludge has a tendency to remain in suspension and it will usually be found desirable to remove this sludge by dispersing in the material about 0.2% of the weight of the material of contact clay, and heating to 130 to 150° C. out of contact with air. Upon filtering, the oil will be found bright and clear. Centrifuging may be employed instead of, or in addition to, the contact clay treatment.

There may be cases as, for example, with the highly reactive extracts from California crude, where it is not possible to obtain a separation of the sludge when acid pretreating. In such cases the procedure for removing the sludge may be varied, or by mixing the requisite amount of acid and clay with the oil concomitantly, rapidly heating to about 130° C., cooling and filtering.

Upon completion of the above treatments, the material may be sulphonated. The material is diluted with or dissolved in liquid sulphur dioxide as before and sulphonated, solvent-washed, and neutralized in the same manner. After neutralization the product may be dried by spraying, or on drying rolls, or it may be extracted with a water immiscible alcohol such as isopropyl, to remove it from the salt formed by neutralization.

As examples of materials prepared according to this invention and to show the relative value for the present purposes of the various fractions of the extract or original oil, the following table has been prepared from data obtained by testing products prepared according to the preferred process from various fractions of a transformer oil Edeleanu extract from Texas Gulf crude, taken from the distillation following the extraction:

| Boiling point of fraction 5 mm. pressure | Relative detergency |
| --- | --- |
| 140°–153° C | |
| 164°–175° C | 45 |
| 183°–193° C | 62 |
| 200°–208° C | 64 |
| 223°–240° C | 72 |
| | 95 |

The relative detergency figures for the above table were obtained by testing the samples in a standard launderometer.

In order to furnish an understanding of the manner in which the products of this invention may be used, the following examples may be given:

A washing powder was formed from 60% of soda ash and 40% of the new product, half of which was active ingredient and half of which was sodium sulphate formed in the neutralization. The result was an excellent washing composition of high deterging efficiency and the soda ash did not appear to adversely affect the sulphonated product.

A mixture of 85% pine oil and 15% water containing 0.5% of the product (50% active ingredient) was hand shaken until a cream-like emulsion was obtained. This emulsion showed no signs of breaking after four months standing at room temperature.

Many uses for the new products other than those mentioned will become immediately apparent. To mention but a few possibilities, they are useful in the flotation of ores, in shampoos, in dye baths, and for many detergent purposes. They may be used either alone or in admixture with soaps and/or soap fillers, such as sodium silicate, bentonite, calcium carbonate, talc and pumice. The final products may take the form of powders, beads, bars, solutions, emulsions, creams or salves, or any other forms desired.

In this specification the term sulphonation has been used in the broad sense to mean the reaction of sulphuric acid upon the oil products and not merely the formation of one class of chemical compounds. Furthermore, the details of the reagents, process, such as the quantities of the reagents, their concentrations and the time periods and temperatures for the reactions are but examples of satisfactory constants for a particular type of oil. As the type of oil is varied, as it may be within the scope of this invention, these various factors will necessarily vary, but the application of the general principles set forth herein, and the varying of these factors in accordance with the needs of the particular situation are within the concept of this invention.

I claim:

1. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by fractionally distilling and solvent extracting mineral oil so as to produce a material boiling around 210 to 250° C. at 5 mm. pressure, said solvent extraction being performed by the use of a preferential solvent which tends to dissolve certain constituents of the oil and not to dissolve others, the constituents which the solvent tends to dissolve being generally those of an unsaturated nature, including those of aromatic nature, and thereafter treating the material, while in solution in liquid sulphur dioxide, with a sulphonating agent.

2. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by fractionally distilling and solvent extracting mineral oil so as to produce material boiling around 210 to 250° C. at 5 mm. pressure, said solvent extraction being performed at a temperature of around −15 to +15° C. by use of a preferential solvent which tends to dissolve certain constituents of the oil and not to dissolve others, the constituents which the solvent tends to dissolve being generally those of an unsaturated nature, including those of aromatic nature, and thereafter treating the material, while in solution in liquid sulphur dioxide, with a sulphonating agent.

3. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by fractionally distilling, solvent extracting, caustic, acid and contact clay treating mineral oil, so as to produce a material boiling around 210 to 250° C. at 5 mm. pressure, said solvent extraction being performed at around −15 to +15° C. by the use of liquid sulphur dioxide, which tends to dissolve certain constituents of the oil and not to dissolve others, the constituents which the solvent tends to dissolve being generally those of an unsaturated nature, including those of aromatic nature, and thereafter treating the material, while in solution in liquid sulphur dioxide, with a sulphonating agent.

4. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by fractionally distilling and solvent extracting mineral oil so as to produce a material boiling between 220 and 240° C. at 5 mm. pressure, said solvent extraction being performed by the use of a preferential solvent which tends to dissolve certain constituents of the oil and not to dissolve others, the constituents which the solvent tends to dissolve being generally those of an unsaturated nature, including those of aromatic nature, and thereafter treating the material, while in solution in liquid sulphur dioxide, with a sulphonating agent.

5. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by fractionally distilling and solvent extracting mineral oil so as to produce a material boiling between 220 and 240° C. at 5 mm. pressure, said solvent extraction being performed at a temperature of around −10° C. by the use of liquid sulphur dioxide, which tends to dissolve certain constituents of the oil and not to dissolve others, the constituents which the solvent tends to dissolve being generally those of an unsaturated nature, including those of aromatic nature, and thereafter treating the material, while in solution in liquid sulphur dioxide, with a sulphonating agent.

6. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by fractionally distilling and solvent extracting naphthene base crude mineral oil distillate so as to produce a material boiling around 210 to 250° C. at 5 mm. pressure, said solvent extraction being performed by the use of a preferential solvent which tends to dissolve certain constituents of the oil and not to dissolve others, the constituents which the solvent tends to dissolve being generally those of an unsaturated nature, including those of aromatic nature, and thereafter treating the material, while in solution in liquid sulphur dioxide, with a sulphonating agent.

7. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by fractionally distilling and solvent extracting mineral oil so as to produce a material boiling around 210 to 250° C. at 5 mm. pressure, said solvent extraction being performed by the use of a preferential solvent which tends to dissolve certain constituents of the oil and not to dissolve others, the constituents which the solvent tends to dissolve being generally those of an unsaturated nature, including those of aromatic nature, thereafter treating the material, while in solution in liquid sulphur dioxide, with a sulphonating agent, and washing the product with a substantially saturated hydrocarbon solvent substantially all of which volatilizes below 250° F.

8. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by fractionally distilling and solvent extracting mineral oil so as to produce a material boiling around 210 to 250° C. at 5 mm. pressure, said solvent extraction being performed by the use of a preferential solvent which tends to dissolve certain constituents of the oil and not to dissolve others, the constituents which the solvent tends to dissolve being generally those of an unsaturated nature, including those of aromatic nature, and thereafter treating the material, while in solution in liquid sulphur dioxide, with 20% oleum in a quantity about equal in weight to that of the extracted material.

9. A composition of matter characterized by its ability to act as a detergent and as a wetting agent in aqueous solutions, by a substantial absence of color and odor, both in its dry form and in aqueous solutions, and by the fact that its aqueous solutions do not stain fabrics, said composition being preparable by fractionally distilling and solvent extracting mineral oil so as to produce a material boiling around 210 to 250° C. at 5 mm. pressure, said solvent extraction being performed by the use of a preferential solvent which tends to dissolve certain constituents of the oil and not to dissolve others, the constituents which the solvent tends to dissolve being generally those of an unsaturated nature, including those of aromatic nature, and thereafter treating the material, while in solution in liquid sulphur dioxide with a sulphonating agent at a temperature of not to exceed +5 C.

ROBERT L. BRANDT.